(12) United States Patent
Chen

(10) Patent No.: US 10,554,630 B2
(45) Date of Patent: Feb. 4, 2020

(54) SYSTEMS AND METHODS FOR SECURE PASSWORD TRANSMISSION AND VERIFICATION

(71) Applicant: Facebook, Inc., Menlo Park, CA (US)

(72) Inventor: Evan Lee Chen, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 81 days.

(21) Appl. No.: 15/398,658

(22) Filed: Jan. 4, 2017

(65) Prior Publication Data

US 2018/0191688 A1 Jul. 5, 2018

(51) Int. Cl.
*H04L 29/06* (2006.01)

(52) U.S. Cl.
CPC ........ *H04L 63/0428* (2013.01); *H04L 63/083* (2013.01)

(58) Field of Classification Search
None
See application file for complete search history.

(56) References Cited

U.S. PATENT DOCUMENTS

| | | | | |
|---|---|---|---|---|
| 2006/0047606 A1* | 3/2006 | Yach | ....................... | G06F 21/42 705/76 |
| 2012/0188064 A1* | 7/2012 | Mahaffey | ............ | H04L 63/1441 340/384.1 |
| 2013/0125221 A1* | 5/2013 | Agrawal | ................ | H04L 9/0863 726/6 |
| 2013/0212385 A1* | 8/2013 | Schechter | ............... | G06F 21/31 713/168 |
| 2013/0283361 A1* | 10/2013 | Rao | ......................... | G06F 21/31 726/7 |
| 2016/0112396 A1* | 4/2016 | Paya | ................... | H04L 63/0823 713/156 |
| 2016/0294556 A1* | 10/2016 | Vortriede | ................ | H04L 9/321 |
| 2017/0084118 A1* | 3/2017 | Robinson | ............ | G07F 17/3225 |
| 2017/0337397 A1* | 11/2017 | Tang | ................... | G06F 21/6254 |

OTHER PUBLICATIONS

Yue Wu, et al., Security and trust management in opportunistic networks: A survey, 2014, Securities and Communication Networks 2015; 8-1812-1827 (Year: 2014).*
Florecio et al., Where do Security Policies Come From? 2010 Symposium on Usable Privacy and Security (SOUPS), Jul. 14-16, 2010, Redmond, WA, USA. (Year: 2010).*

* cited by examiner

*Primary Examiner* — Luu T Pham
*Assistant Examiner* — Edward X Long
(74) *Attorney, Agent, or Firm* — Sheppard Mullin Richter & Hampton LLP

(57) ABSTRACT

Systems, methods, and non-transitory computer-readable media can receive a password from a user. A first password hash is generated based on the password and a first salt. A second password hash is generated based on the first password hash and a second salt. The first salt, the second salt, and the second password hash are transmitted to a third party.

7 Claims, 7 Drawing Sheets

200

| | |
|---|---|
| USERNAME | userA@userA.com |
| PASSWORD | hunter2 |
| SALT FRAGMENT A | 9qf3jm8 |
| SALT FRAGMENT B | asp93ff |
| CONCATENATE PASSWORD AND SALT FRAGMENT A ("FIRST SALTED PASSWORD") | hunter29qf3jm8 |
| HASH(FIRST SALTED PASSWORD) ("FIRST PASSWORD HASH") | pq3i9wef7q |
| CONCATENATE FIRST PASSWORD HASH AND SALT FRAGMENT B ("SECOND SALTED PASSWORD") | pq3i9wef7qasp93ff |
| HASH(SECOND SALTED PASSWORD) ("FINAL PASSWORD HASH") | sda768xc7 |

FIGURE 2

| | |
|---|---|
| USERNAME ENTERED BY USER LOGIN ATTEMPT ("USERNAME") | userA@userA.com |
| PASSWORD ENTERED BY USER LOGIN ATTEMPT THAT REQUIRES VERIFICATION ("PASSWORD") | hunter2 |
| REFERENCE HASH ASSOCIATED WITH LOGIN ATTEMPT USERNAME | sda768xc7 |
| SALT FRAGMENT A ASSOCIATED WITH LOGIN ATTEMPT USERNAME | 9qf3jm8 |
| SALT FRAGMENT B | asp93ff |
| CONCATENATE PASSWORD AND SALT FRAGMENT A ("FIRST SALTED VERIFICATION PASSWORD") | hunter29qf3jm8 |
| HASH(FIRST SALTED VERIFICATION PASSWORD) ("FIRST VERIFICATION PASSWORD HASH") | pq3i9wef7q |
| CONCATENATE FIRST VERIFICATION PASSWORD HASH AND SALT FRAGMENT B ("SECOND SALTED VERIFICATION PASSWORD") | pq3i9wef7qasp93ff |
| HASH(SECOND SALTED VERIFICATION PASSWORD) ("SECOND VERIFICATION PASSWORD HASH") | sda768xc7 |
| COMPARE SECOND VERIFICATION PASSWORD HASH AND REFERENCE HASH | sda768xc7 = sda768xc7 PASSWORD VERIFIED |

SYSTEMS AND METHODS FOR SECURE PASSWORD TRANSMISSION AND VERIFICATION

FIELD OF THE INVENTION

The present technology relates to the field of information security. More particularly, the present technology relates to secure password transmission and verification.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system may be presented with advertisements from advertisers. Certain types of advertisements may be configured to receive user information from a user. For example, certain types of advertisements may receive user email information. User email information can be used, for example, to sign users up for mailing lists so that the advertiser can provide information such as product updates, sale information, and/or additional advertisements via email.

SUMMARY

Various embodiments of the present disclosure can include systems, methods, and non-transitory computer readable media configured to receive a password from a user. A first password hash is generated based on the password and a first salt. A second password hash is generated based on the first password hash and a second salt. The first salt, the second salt, and the second password hash are transmitted to a third party.

In an embodiment, the first password hash is generated based on a concatenation of the password and the first salt.

In an embodiment, the second password hash is generated based on a concatenation of the first password hash and the second salt.

In an embodiment, the first salt is uniquely generated for the user.

In an embodiment, the second salt is uniquely generated for the third party.

In an embodiment, the password is received from the user to create an account with the third party.

In an embodiment, the receiving the password from the user further comprises receiving a username from the user.

In an embodiment, the username is transmitted to the third party.

In an embodiment, the second salt is transmitted to the third party separately from the first salt and the second password hash.

In an embodiment, the first salt and the second password hash are transmitted to the third party in response to a request from the user to create an account with the third party.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 2 illustrates an example scenario associated with secure transmission of password information, according to an embodiment of the present disclosure.

FIG. 3 illustrates an example scenario associated with verification of login credentials, according to an embodiment of the present disclosure.

Figure 1:
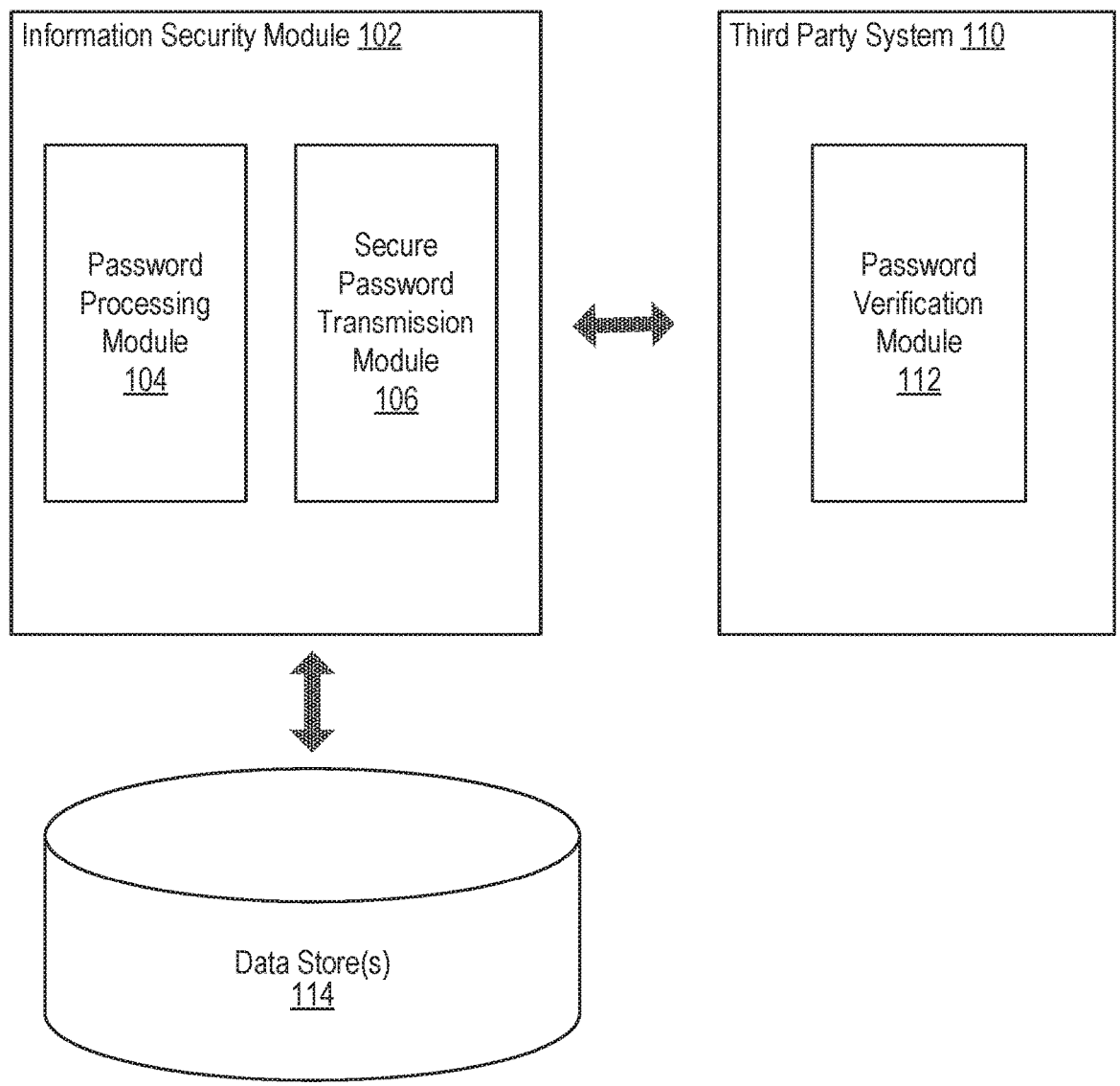
FIG. 1 illustrates an example system including an information security module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Secure Password Transmission and Verification

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system may be presented with advertisements from advertisers. Certain types of advertisements may be configured to receive user information from a user. For example, certain types of advertisements may receive user email information. User email information can be used, for example, to sign users up for mailing lists so that the advertiser can provide information such as product updates, sale information, and/or additional advertisements via email.

While many advertisers are content with receiving basic user contact information via advertisements, there may be instances in which it may be advantageous to receive more sensitive user information via an advertisement. For example, an advertiser may desire to have users sign up for accounts with the advertiser by having the user provide a username and password for a new account. However, under conventional approaches, receipt of such sensitive information, such as password information, via an advertisement can be risky. This is due to the fact that transmission of the sensitive information to the advertiser may result in the sensitive information being intercepted. For example, if an advertiser places an advertisement on a social networking system, and username and password information is received from a user through the advertisement, the social networking system may be required to transmit the username and password information to the advertiser. However, such transmissions may be intercepted by malicious users.

Therefore, an improved approach can be beneficial for overcoming these and other disadvantages associated with conventional approaches. Based on computer technology, the disclosed technology can securely transmit password information to a third party. In certain embodiments, the disclosed technology can securely transmit password information from a social networking system to a third party, such as an advertiser. In various embodiments, username and password information is received from a user. The user may, for example, be attempting to sign up for a new account with a third party through the social networking system. A first password hash can be generated based on the password and a first salt (e.g., based on a concatenation of the password and a first salt). A second password hash can be generated based on the first password hash and a second salt (e.g., based on a concatenation of the first password hash and a second salt). The third party can be provided with the first salt, the second salt, and the second password hash. In various embodiments, the first salt and the second password hash can be associated with the user, while the second salt can be associated with the third party. In various embodiments, when the user attempts to log in to the third party by providing login credentials, the user's login credentials can be verified using the first salt, the second salt, and the second password hash, as will be described in greater detail herein.

FIG. 1 illustrates an example system 100 including an example information security module 102 configured to process and securely transmit password information, according to an embodiment of the present disclosure. In various embodiments, the information security module 102 can be configured to securely transmit password information to a third party system 110. For example, password information can be securely transmitted from a social networking system to a third party, such as an advertiser. In various embodiments, username and password information can be received from a user. The user may, for example, be attempting to sign up for a new account with the advertiser through an advertisement placed on the social networking system. A first password hash can be generated based on the password and a first salt. For example, a first password hash can be generated based on a concatenation of the password and the first salt. A second password hash can be generated based on the first password hash and a second salt. For example, the second password hash can be generated based on a concatenation of the first password hash and the second salt. The third party system 110 can be provided with the first salt, the second salt, and the second password hash. This information can then be used by the third party system 110 to verify login information when the user attempts to log in to the user's account with the third party. In certain embodiments, the first salt and the second password hash can be associated with the user, while the second salt can be associated with the third party.

In various embodiments, when a user attempts to log in to a third party by providing login credentials, the user's login credentials can be verified using the first salt, the second salt, and the second password hash. In essence, the user's login credentials can be verified by re-performing the steps performed by the social networking system, and confirming that the resultant password hash matches the reference hash provided by the social networking system. For example, a user's login credentials can include a username and a password. A first salt and a reference hash associated with the username can be retrieved. The first salt and the reference hash may be the first salt and the second password hash provided by the social networking system. A first verification password hash can be generated based on the password and the first salt, and a second verification password hash can be generated based on the first verification password hash and the second salt. The second verification password hash can be compared to the reference hash associated with the username to verify the login credentials.

As shown in the example of FIG. 1, the information security module 102 can include a password processing module 104 and a secure password transmission module 106. In some instances, the example system 100 can include at least one data store 114. In various embodiments, the example system 100 can also include a third party system 110 comprising a password verification module 112. The components (e.g., modules, elements, etc.) shown in this figure and all figures herein are exemplary only, and other implementations may include additional, fewer, integrated, or different components. Some components may not be shown so as not to obscure relevant details.

The information security module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the information security module 102 can be implemented, in part or in whole, as software running on one or more computing devices or systems, such as on a server computing system or a user (or client) computing system. For example, the information security module 102 or at least a portion thereof can be implemented as or within an application (e.g., app), a program, or an applet, etc., running on a user computing device or a client computing system, such as the user device 610 of FIG. 6. In another example, the information security module 102 or at least a portion thereof can be implemented using one or more computing devices or systems that include one or more servers, such as network servers or cloud servers. In some instances, the information security module 102 can, in part or in whole, be implemented within or configured to operate in conjunction with a social networking system (or service), such as the social networking system 630 of FIG. 6. It should be understood that there can be many variations or other possibilities.

The information security module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the information security module 102. For example, the data store 114 can store hashing algorithms, salt information, password hash information, and the like, as described in greater detail herein. It is contemplated that there can be many variations or other possibilities.

The password processing module 104 can be configured to process password information, according to an embodiment of the present disclosure. In various embodiments, the password processing module 104 can be configured to receive password information from a user. For example, the user may submit username and password information in order to create a new account with a third party. A username, or username information, as used herein, includes any information that can be used to identify a user. This can include, for example, a name, a social security number, an email address, and the like. The password processing module 104 can be configured to process the password information for secure transmission by salting and hashing the password multiple times. For example, the password can be concatenated with a first salt to generate a first salted password. In certain embodiments, the first salt can be uniquely generated for the user. The first salted password (e.g., the concatenation of the password and the first salt) can be passed through a hashing algorithm to generate a first password hash. The hashing algorithm can be configured to generate a hash having a fixed number of characters. The first password hash can be concatenated with a second salt to generate a second salted password. In certain embodiments, the second salt may be generated for and/or associated with the third party (e.g., an advertiser on a social networking system). The second salted password can be passed through a hashing algorithm to generate a second password hash. The same hashing algorithm may be used to generate the first and second password hashes.

The secure password transmission module 106 can be configured to securely transmit password information to a third party, according to an embodiment of the present disclosure. Password information can be securely transmitted to the third party by transmitting the first salt, the second salt, and the second password hash to the third party. The password itself is not transmitted to the third party. In certain embodiments, username information may also be transmitted to the third party. The third party can use this information to verify user login credentials, as will be described in greater detail herein.

As stated above, in certain embodiments, the first salt may be uniquely generated for the user, and the second salt may be associated with and/or uniquely generated for the third party. As such, the first salt may be uniquely generated at the time a user requests to create an account with the third party (i.e., at the time the user submits username and password information), and also transmitted to the third party at this time along with the second, or final, password hash. However, the second salt, which is associated with the third party, may be utilized for many user accounts with the third party (e.g., all user accounts with the third party may use the same second salt). As such, the second salt may be provided to the third party separately from the first salt and the final password hash, e.g., before any users have created accounts at the third party through the social networking system, or when a first user creates an account at the third party through the social networking system. Functionality of the password processing module 104 and the secure password transmission module 106 are described in greater detail herein with reference to FIG. 2.

As shown in FIG. 1, in various embodiments, the information security module 102 can communicate with a third party system 110, for example, to securely transmit password information. The third party system can include a password verification module 112. The password verification module 112 can be configured to verify login credentials, according to an embodiment of the present disclosure. As described briefly above, when, for example, a user attempts to create an account with a third party through an advertisement on a social networking system, the user may provide the social networking system with a username and a password to create a new account. In various embodiments, as described above, the social networking system can hash the password using a first salt and a second salt. The social networking system can provide the third party with the username, the first salt, the second salt, and a final password hash associated with the user (e.g., associated with the username). The final password hash can be stored by the third party system 110 as a reference hash associated with the user. When the user attempts to log in at the third party, the user can provide login credentials, e.g., a username and a password. The password provided by the user can be verified using the information provided by the social networking system, e.g., the first salt, the second salt, and the reference hash.

When a user attempts to login using login credentials, the password verification module 112 can be configured to retrieve a first salt, a second salt, and a reference hash. In certain embodiments, the first salt can be associated with and/or unique to a particular user, such that the first salt is retrieved based on the username provided as part of the login credentials. In certain embodiments, the second salt can be associated with the third party, and, as such, the same second salt can be used for all login attempts with the third party. In certain embodiments, the reference hash is the second (or final) password hash provided by the social networking system (e.g., the information security module 102), and is associated with and/or unique to a particular user. As such, the reference hash may be retrieved based on the username provided as part of the login credentials. The password provided by the user as part of the login credentials is verified by essentially retracing the steps taken by the social networking system to generate the reference hash (e.g., by the password processing module 104). The password can be concatenated with the first salt, and run through a hashing algorithm to generate a first password hash. The first password hash can be concatenated with the second salt, and then run through a hashing algorithm to generate a second password hash. The second password hash can be compared to the reference hash associated with the user. If the second password hash matches the reference hash, the password is correct and the login credentials have been verified. However, if the second password hash does not match the reference hash, the login credentials cannot be verified, and the login attempt may be denied. The password verification module 112 is described in greater detail herein with reference to FIG. 3.

FIG. 2 illustrates an example scenario 200 associated with secure transmission of password information. In FIG. 2, a user has entered a username ("userA@userA.com"), and a password, "hunter2," that must be securely transmitted to a third party. A first salt, Salt Fragment A ("9qf3jm8"), and a second salt, Salt Fragment B ("asp93ff"), are generated and/or retrieved. As discussed above, in certain embodiments, the first salt may be associated with the user that entered the password, and the second salt may be associated with the third party to whom password information is being transmitted. The password is concatenated with Salt Fragment A to generate a first salted password ("hunter29qf3jm8"). The first password hash is passed through a hashing algorithm to generate a first password hash ("pq3i9wef7q"). The hashing algorithm may be configured to generate a hash having a fixed number of characters. In the example scenario 200, the hashing algorithm is configured to generate a hash having 10 characters. The first password hash is concatenated with Salt Fragment B to generate a second salted password ("pq3i9wef7qasp93ff"). The second salted password is passed through the hashing algorithm to generate a second, or final, password hash ("sda768xc7"). As discussed above, Salt Fragment A, Salt Fragment B, and the final password hash can be transmitted to a third party (possibly along with a username), so that the third party can use this information at a later time for login credential verification.

FIG. 3 illustrates an example scenario 300 associated with verification of login credentials. In the example scenario 300, a user has entered login credentials, including a username ("userA@userA.com") and a password ("hunter2"). The login credentials must be verified. A reference hash associated with the username is retrieved ("sda768xc7"). A first salt fragment associated with the username, Salt Fragment A, is retrieved ("9qf3jm8"). A second salt fragment, Salt Fragment B, is also retrieved ("asp93ff"). The password is concatenated with Salt Fragment A to generate a first salted verification password ("hunter29q3jm8"). The first salted verification password is passed through a hashing algorithm to generate a first verification password hash ("pq3i9wef7q"). The hashing algorithm is the same hashing algorithm that was used by the social networking system (e.g., in the example scenario FIG. 2) so as to ensure that the resulting hashes will be identical. The first verification password hash is concatenated with Salt Fragment B to generate a second salted verification password ("pq3i9wef7qasp93ff"). The second salted verification password is passed through the hashing algorithm to generate a second verification password hash ("sda768xc7"). The second verification password hash is compared with the reference hash associated with the username. The second verification password hash matches the reference hash, and, as such, the login credentials are verified. In certain embodiments, the reference hash is generated per user login attempt.

Figure 4:
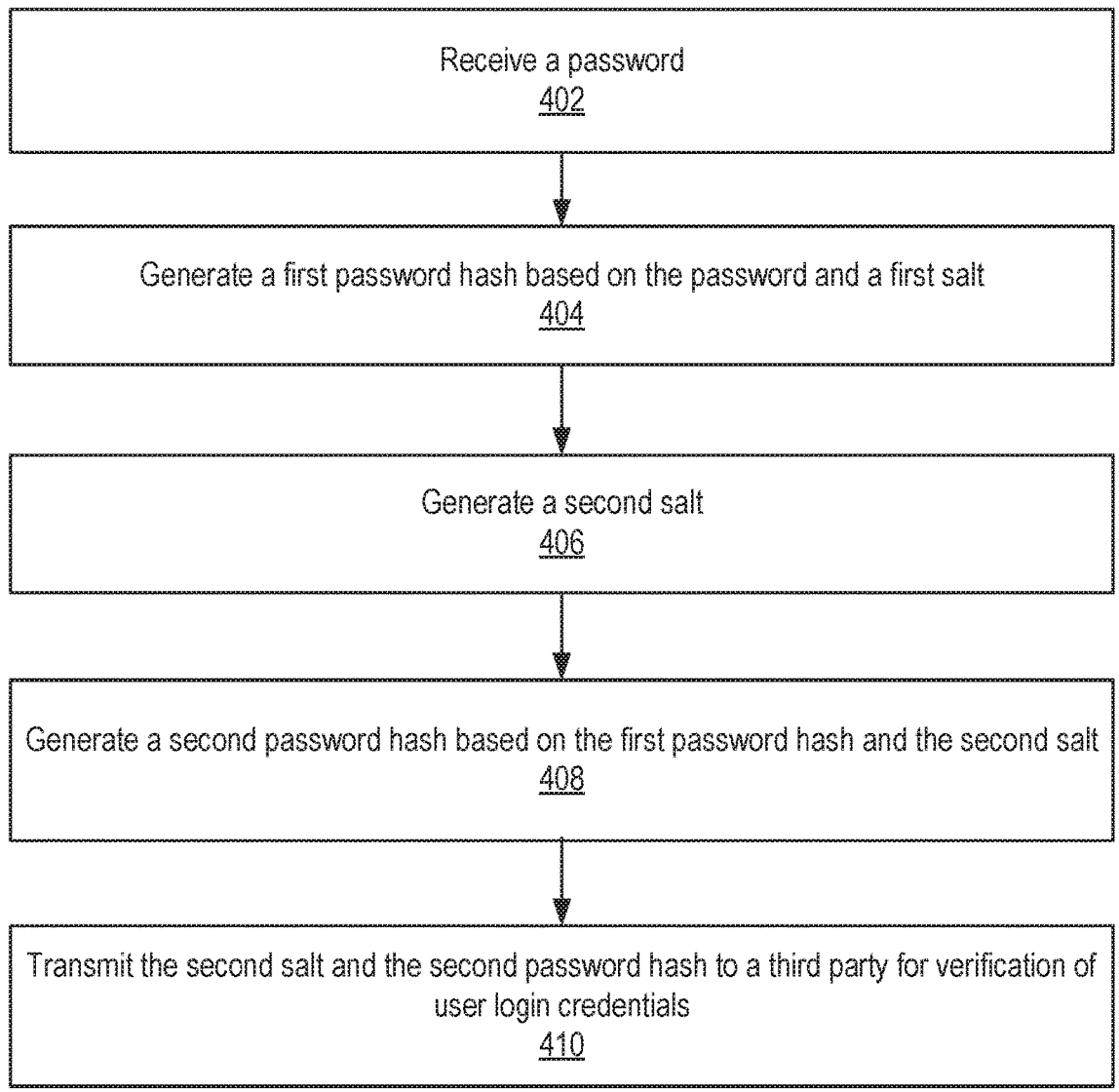
FIG. 4 illustrates an example method associated with secure transmission of password information, according to an embodiment of the present disclosure.

FIG. 4 illustrates an example method 400 associated with secure transmission of password information, according to an embodiment of the present disclosure. It should be appreciated that there can be additional, fewer, or alternative steps performed in similar or alternative orders, or in parallel, based on the various features and embodiments discussed herein unless otherwise stated.

At block 402, the example method 400 can receive a password. At block 404, the example method 400 can generate a first password hash based on the password and a first salt. At block 406, the example method 400 can generate a second salt. At block 408, the example method can generate a second password hash based on the first password hash and the second salt. At block 410, the example method 400 can transmit the second salt and the second password hash to a third party for verification of user login credentials. Other suitable techniques that incorporate various features and embodiments of the present technology are possible.

Figure 5:
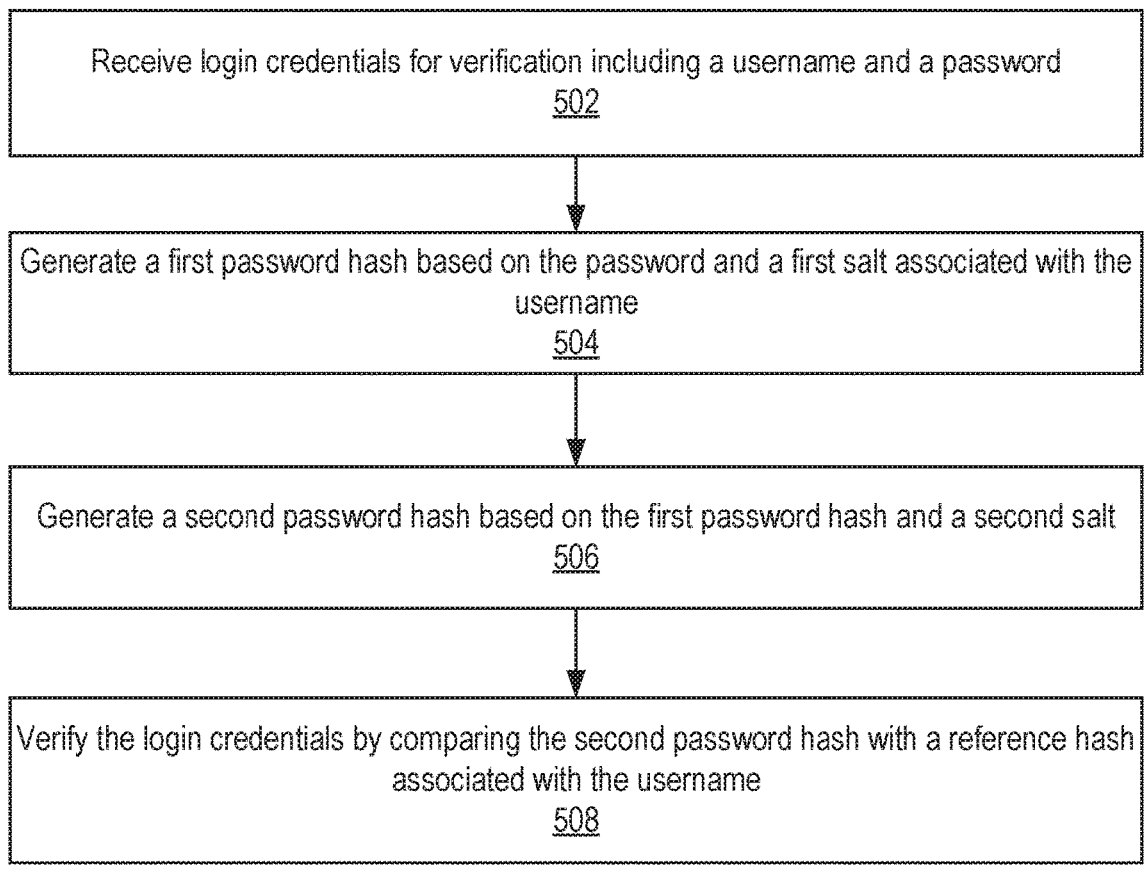
FIG. 5 illustrates an example method associated with verification of login credentials, according to an embodiment of the present disclosure.

FIG. 5 illustrates an example method 500 associated with verification of user login credentials, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can receive login credentials for verification including a username and a password. At block 504, the example method 500 can generate a first password hash based on the password and a first salt associated with the username. At block 506, the example method 500 can generate a second password hash based on the first password hash and a second salt. At block 508, the example method 500 can verify the login credentials by comparing the second password hash with a reference hash associated with the username. Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 6:
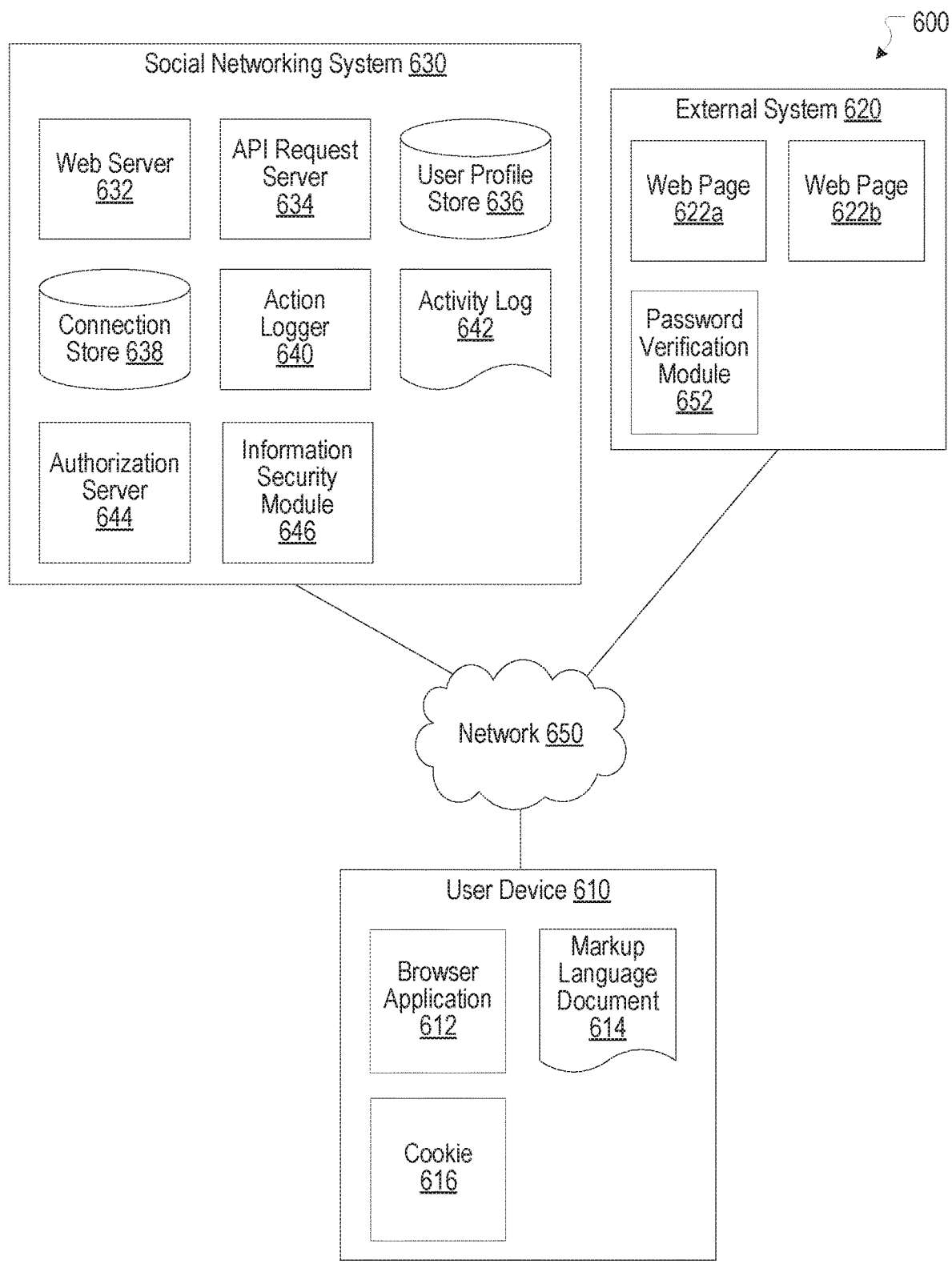
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and provides users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an information security module 646. The information security module 646 can, for example, be implemented as the information security module 102, as discussed in more detail herein. As discussed previously, it should be appreciated that there can be many variations or other possibilities. For example, in some embodiments, one or more functionalities of the information security module 646 can be implemented in the user device 610. In some embodiments, the external system 620 can include a password verification module 652. The password verification module 652 can, for example, be implemented as the password verification module 112, as discussed in more detail herein. Again, it should be appreciate that there can be many variations or other possibilities. For example, in some embodiments, one or more functionalities of the password verification module 652 can be implemented in the user device 610 or the social networking system 630.

Hardware Implementation

Figure 7:
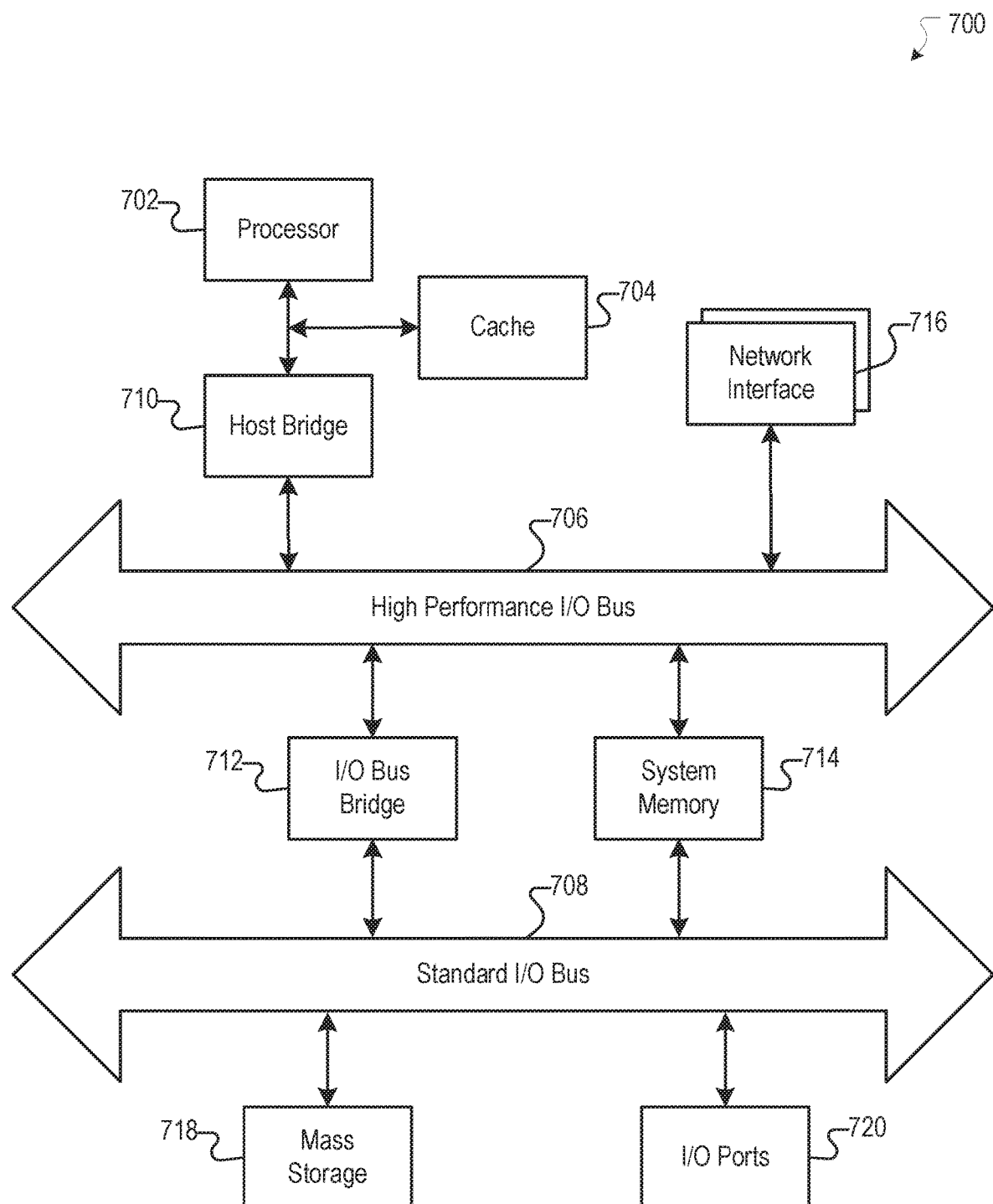
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system associated with a social networking system, a password from a user;
   generating, by the computing system associated with the social networking system, a first password hash based on the password and a first salt,
      wherein the first salt is uniquely generated for the user, and
      wherein the first password hash is generated based on a concatenation of the password and the first salt;
   generating, by the computing system associated with the social networking system, a second password hash based on the first password hash and a second salt,
      wherein the second password hash is generated based on a concatenation of the first password hash and the second salt,
      wherein the second salt is uniquely generated for a third party for authentication of a plurality of user accounts with the third party, and
      wherein the same second salt is applied to a plurality of user accounts for authentication; and
   transmitting, by the computing system associated with the social networking system, the first salt and the second password hash to the third party for authentication of the password, wherein
      the second salt is provided to the third party prior to and separate from the transmitting the first salt and the second password hash to the third party.

2. The computer-implemented method of claim 1, wherein the password is received from the user to create an account with the third party.

3. The computer-implemented method of claim 2, wherein the receiving the password from the user further comprises receiving a username from the user.

4. The computer-implemented method of claim 3, further comprising transmitting the username to the third party.

5. The computer-implemented method of claim 1, wherein the first salt and the second password hash are transmitted to the third party in response to a request from the user to create an account with the third party.

6. A system comprising:
- at least one processor; and
- a memory storing instructions that, when executed by the at least one processor, cause the system to perform a method comprising:
  - receiving a password from a user;
  - generating a first password hash based on the password and a first salt,
    - wherein the first salt is uniquely generated for the user, and
    - wherein the first password hash is generated based on a concatenation of the password and the first salt;
  - generating a second password hash based on the first password hash and a second salt,
    - wherein the second password hash is generated based on a concatenation of the first password hash and the second salt,
    - wherein the second salt is uniquely generated for a third party for authentication of a plurality of user accounts with the third party, and
    - wherein the same second salt is applied to a plurality of user accounts for authentication; and
  - transmitting the first salt and the second password hash to the third party for authentication of the password, wherein
    - the second salt is provided to the third party prior to and separate from the transmitting the first salt and the second password hash to the third party.

7. A non-transitory computer-readable storage medium including instructions that, when executed by at least one processor of a computing system, cause the computing system to perform a method comprising:
- receiving a password from a user;
- generating a first password hash based on the password and a first salt,
  - wherein the first salt is uniquely generated for the user, and
  - wherein the first password hash is generated based on a concatenation of the password and the first salt;
- generating a second password hash based on the first password hash and a second salt,
  - wherein the second password hash is generated based on a concatenation of the first password hash and the second salt,
  - wherein the second salt is uniquely generated for a third party for authentication of a plurality of user accounts with the third party, and
  - wherein the same second salt is applied to a plurality of user accounts for authentication; and
- transmitting the first salt and the second password hash to the third party for authentication of the password, wherein
  - the second salt is provided to the third party prior to and separate from the transmitting the first salt and the second password hash to the third party.

* * * * *